(12) United States Patent
Park et al.

(10) Patent No.: US 8,204,627 B2
(45) Date of Patent: Jun. 19, 2012

(54) AIR CONDITIONER AND METHOD OF CONTROLLING THE SAME

(75) Inventors: Hee Woong Park, Changwon-si (KR); Dong Ju Kim, Changwon-si (KR); Nae Hyun Park, Changwon-si (KR)

(73) Assignee: LG Electronics Inc., Seoul (KR)

( * ) Notice: Subject to any disclaimer, the term of this patent is extended or adjusted under 35 U.S.C. 154(b) by 280 days.

(21) Appl. No.: 12/382,757

(22) Filed: Mar. 23, 2009

(65) Prior Publication Data
US 2010/0168921 A1    Jul. 1, 2010

(30) Foreign Application Priority Data
Dec. 26, 2008 (KR) .................. 10-2008-0134656

(51) Int. Cl.
*G05B 13/00* (2006.01)
(52) U.S. Cl. ........................ 700/276; 700/153
(58) Field of Classification Search .................. 700/276
See application file for complete search history.

(56) References Cited

U.S. PATENT DOCUMENTS

| | | | | |
|---|---|---|---|---|
| 4,479,190 A * | 10/1984 | Takai et al. ................... 700/276 |
| 4,497,031 A * | 1/1985 | Froehling et al. ............. 700/276 |
| 5,103,391 A * | 4/1992 | Barrett ............................. 700/4 |
| 5,163,399 A * | 11/1992 | Bolander et al. ......... 123/339.17 |
| 5,200,644 A * | 4/1993 | Kobayashi et al. ............. 307/66 |
| 5,331,825 A | 7/1994 | Kim |
| 5,621,662 A * | 4/1997 | Humphries et al. .......... 700/276 |
| 5,870,994 A * | 2/1999 | Kato ........................ 123/339.15 |
| 5,875,639 A | 3/1999 | Kim et al. |
| 5,988,860 A * | 11/1999 | Hefferen et al. .............. 700/276 |
| 6,154,686 A * | 11/2000 | Hefferen et al. .............. 700/276 |
| 6,408,225 B1 * | 6/2002 | Ortmeier et al. .............. 700/254 |
| 6,549,826 B1 * | 4/2003 | Pouchak et al. .............. 700/276 |
| 6,735,968 B2 * | 5/2004 | Kurita et al. .................. 62/228.4 |
| 6,840,053 B2 * | 1/2005 | Lindner et al. ................... 62/140 |
| 6,870,139 B2 * | 3/2005 | Petrenko ....................... 219/482 |
| 7,034,257 B2 * | 4/2006 | Petrenko ....................... 219/482 |
| 7,706,928 B1 * | 4/2010 | Howell et al. ................. 700/295 |
| 7,734,381 B2 * | 6/2010 | Conger et al. ................ 700/301 |
| 2003/0182956 A1 * | 10/2003 | Kurita et al. ................. 62/228.1 |
| 2004/0146085 A1 * | 7/2004 | Lindner et al. ................ 374/109 |
| 2005/0204760 A1 * | 9/2005 | Kurita et al. ................. 62/228.1 |
| 2007/0103319 A1 * | 5/2007 | Pedraza et al. ................ 340/604 |
| 2009/0107160 A1 * | 4/2009 | Montminy et al. ............. 62/239 |
| 2009/0107657 A1 * | 4/2009 | Montminy et al. ...... 165/104.31 |

(Continued)

FOREIGN PATENT DOCUMENTS
CN       1115028 A       1/1996
(Continued)

*Primary Examiner* — Mohammad Ali
*Assistant Examiner* — Anthony Whittington
(74) *Attorney, Agent, or Firm* — McKenna Long & Aldridge LLP

(57) ABSTRACT

The present invention relates to an air conditioner, including a discharge driving unit for discharging an air-conditioned air, a sensor module for rotating and scanning predetermined areas and outputting data for radiation heats of heat sources, and a control unit for calculating observed change-amount signals based on the data and stored old data, acquiring human body information by converting each of the observed change-amount signals into energy levels, and controlling the discharge driving unit.

10 Claims, 11 Drawing Sheets

U.S. PATENT DOCUMENTS

| | | | |
|---|---|---|---|
| 2009/0112368 A1* | 4/2009 | Mann et al. | 700/275 |
| 2009/0230307 A1* | 9/2009 | Han et al. | 250/342 |
| 2010/0060214 A1* | 3/2010 | Woodward | 318/400.09 |
| 2010/0060215 A1* | 3/2010 | Woodward | 318/400.09 |
| 2010/0060216 A1* | 3/2010 | Woodward | 318/400.09 |
| 2010/0060218 A1* | 3/2010 | Woodward | 318/400.15 |
| 2010/0060219 A1* | 3/2010 | Schock et al. | 318/400.21 |

FOREIGN PATENT DOCUMENTS

| | | |
|---|---|---|
| CN | 101294729 A | 10/2008 |
| EP | 1 460 351 | 9/2004 |
| EP | 1985936 A1 | 10/2008 |
| GB | 2 260 830 | 4/1993 |
| WO | WO 2008/066311 A1 | 6/2008 |

* cited by examiner

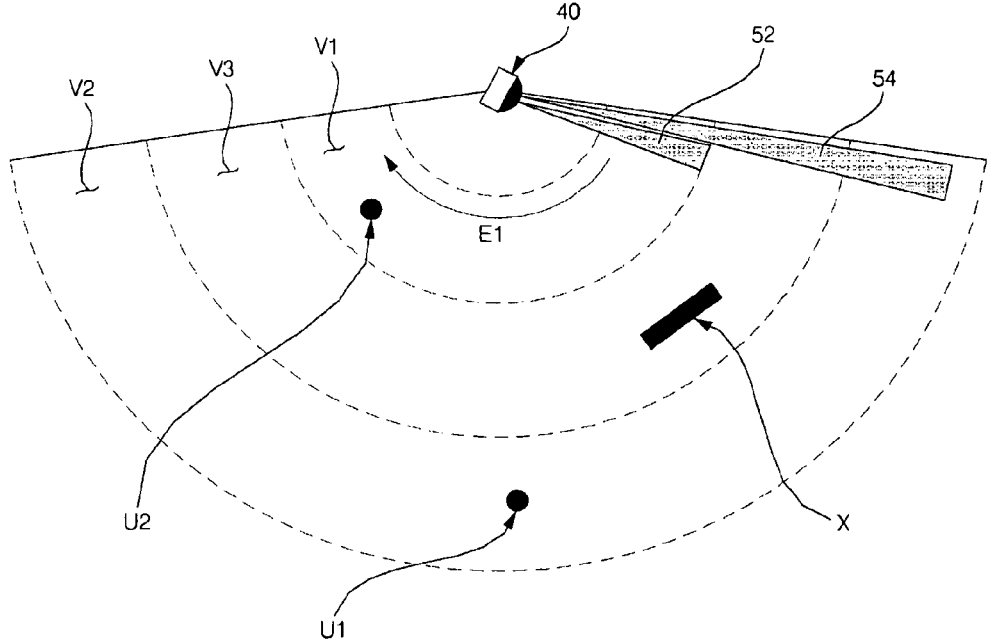
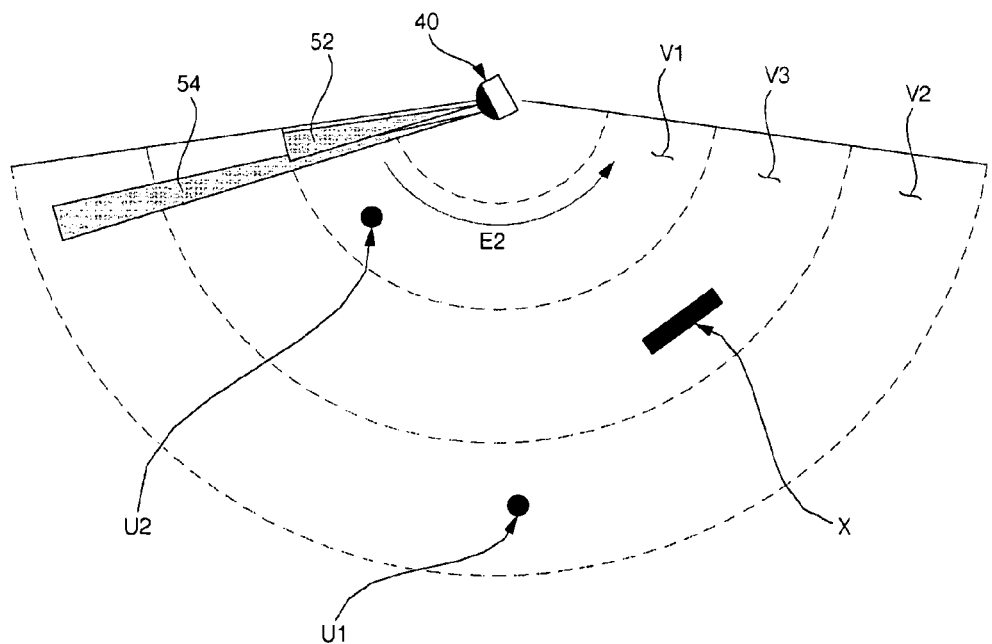

FIG. 9
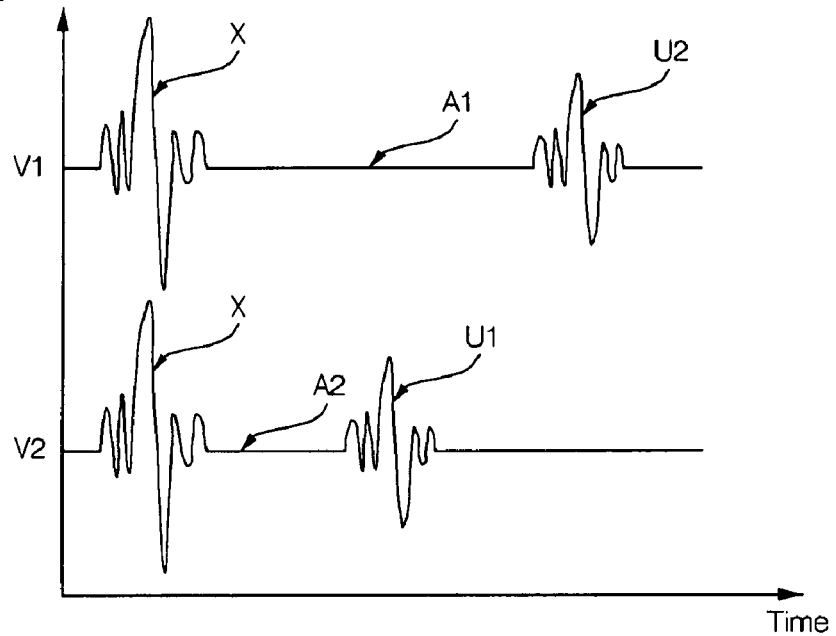
(a)
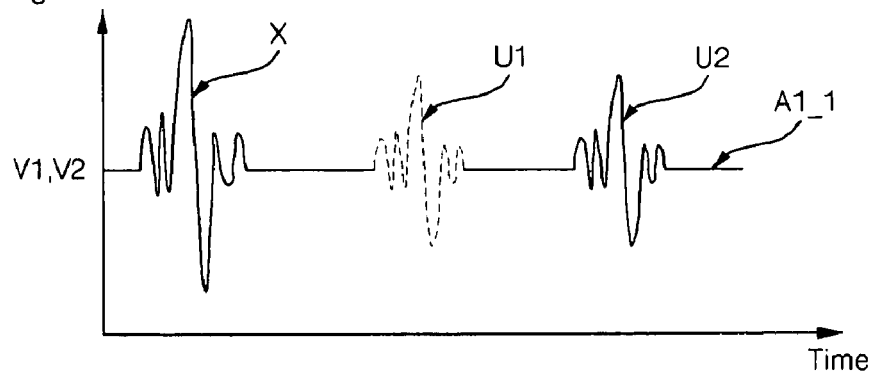
(b)

FIG. 10
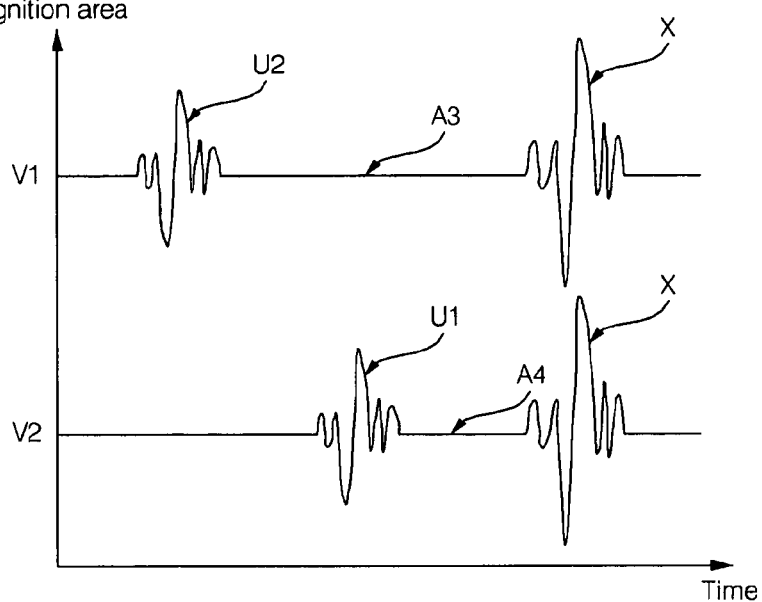
(c)
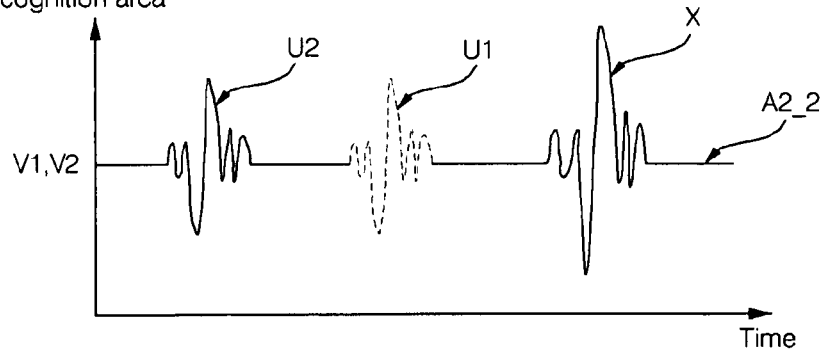
(d)

FIG. 11
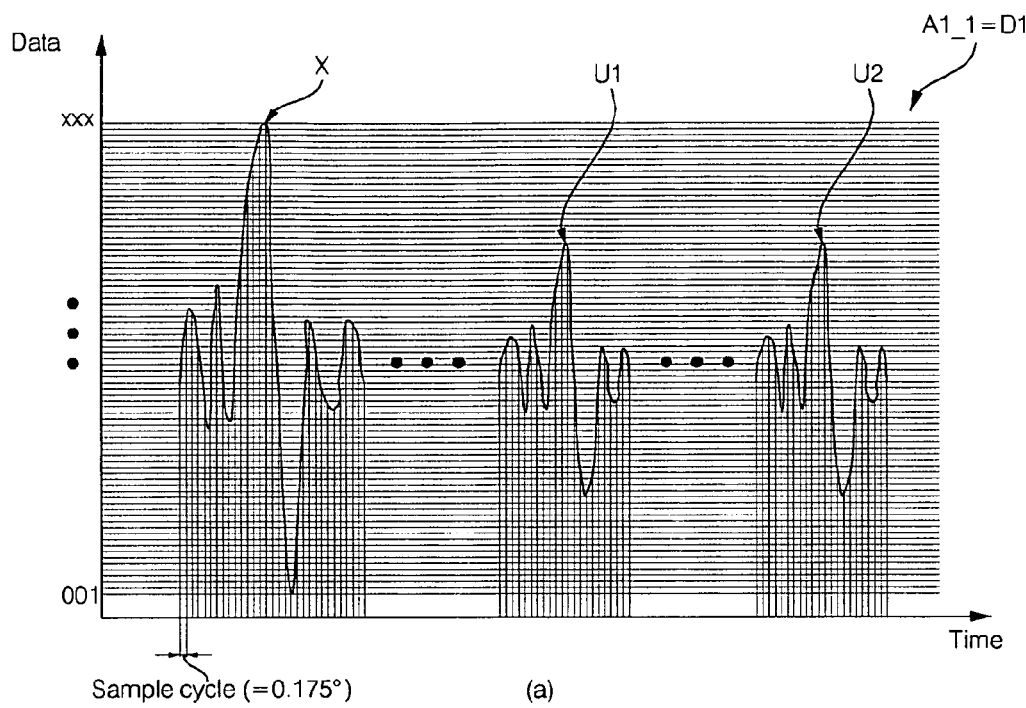
(a)
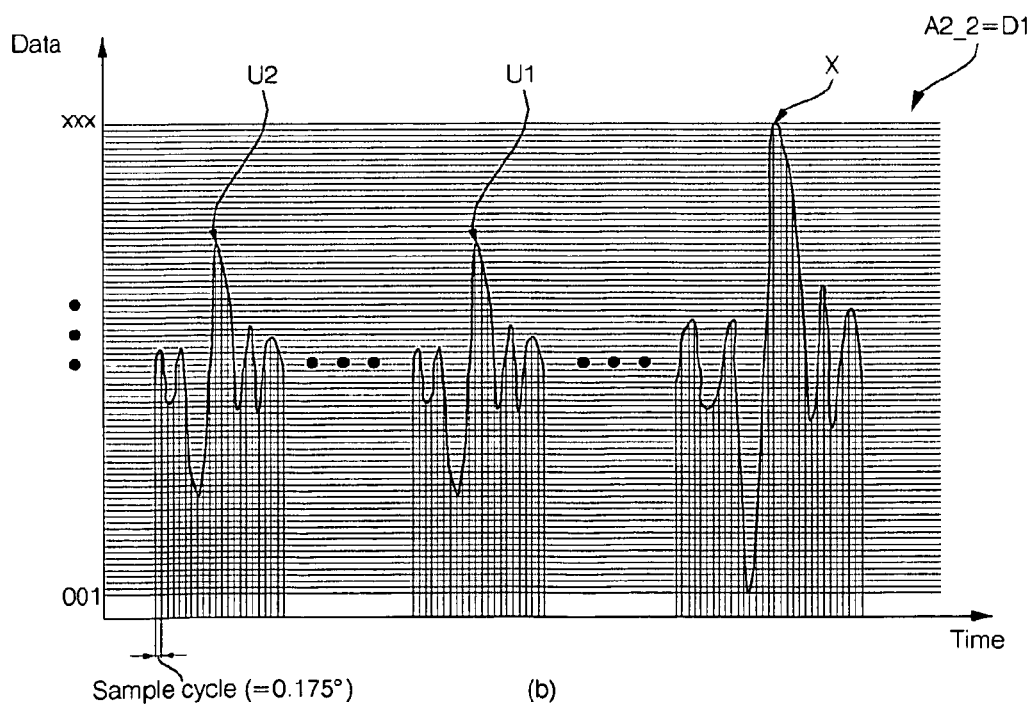
(b)

AIR CONDITIONER AND METHOD OF CONTROLLING THE SAME

This application claims priority to Korean Application No. 10-2008-0134656, filed on Dec. 26, 2008, the contents of which is hereby incorporated by reference in its entirety.

BACKGROUND OF THE INVENTION

1. Field of the Invention

The present invention relates to an air conditioner which is capable of easily detecting the human body from among heat sources within a room.

2. Discussion of the Related Art

In general, air conditioners are household appliances for maintaining indoor air to a state which is most suitable for its use and purpose. For example, the air conditioners may be configured to control the interior of a room in an air cooling state in summer and to control the interior of a room in a warm state in winter. The air conditioners may also be configured to control an indoor humidity and indoor air in a comfortable and clean state. With the gradual expansion and use of accommodation products in life, such as the air conditioners, consumers want products with high energy efficiency, improved performance, and convenient use.

The air conditioners may be divided into a separate type air conditioner in which an indoor unit is separated from an outdoor unit, an integration type air conditioner in which an indoor unit and an outdoor unit are combined into one unit, a wall-mount air conditioner and a frame type air conditioner mounted on a wall, a slim type air conditioner configured to stand in a living room, a single type air conditioner configured to have a capacity capable of driving one indoor unit and installed at narrow places, such as homes, a large and medium-sized air conditioner configured to have a very large capacity and installed in companies or restaurants, a multi-type air conditioner configured to have a capacity enough to drive a number of indoor units.

SUMMARY OF THE INVENTION

It is, therefore, an object of the present invention to provide an air conditioner which is capable of easily detecting the human body from among heat sources within a room.

To achieve the above object, an air conditioner according to an embodiment of the present invention includes a discharge driving unit for discharging an air-conditioned air, a sensor module for rotating and scanning predetermined areas and outputting data for radiation heats of heat sources, and a control unit for calculating observed change-amount signals based on the data and stored old data, acquiring human body information by converting each of the observed change-amount signals into energy levels, and controlling the discharge driving unit.

BRIEF DESCRIPTION OF THE DRAWINGS

The present invention will become more fully understood from the detailed description given herein below and the accompanying drawings, which are given by illustration only, and thus are not limitative of the present invention, and wherein:

FIGS. 7 and 8 are simplified views showing an operation of the sensor module shown in FIG. 6;

FIG. 9 is a waveform showing a first radiation signal detected by the sensor module shown in FIG. 7;

FIG. 10 is a waveform showing a second radiation signal detected by the sensor module shown in FIG. 8;

FIG. 11 is a sampling diagram showing first and second data obtained by respectively sampling the first and second radiation signals shown in FIGS. 9 and 10;

DETAILED DESCRIPTION OF THE EMBODIMENTS

Hereinafter, an air conditioner according to embodiments of the present invention will be described in detail with reference to the accompanying drawings so that they can be readily implemented by those skilled in the art.

Figure 1:
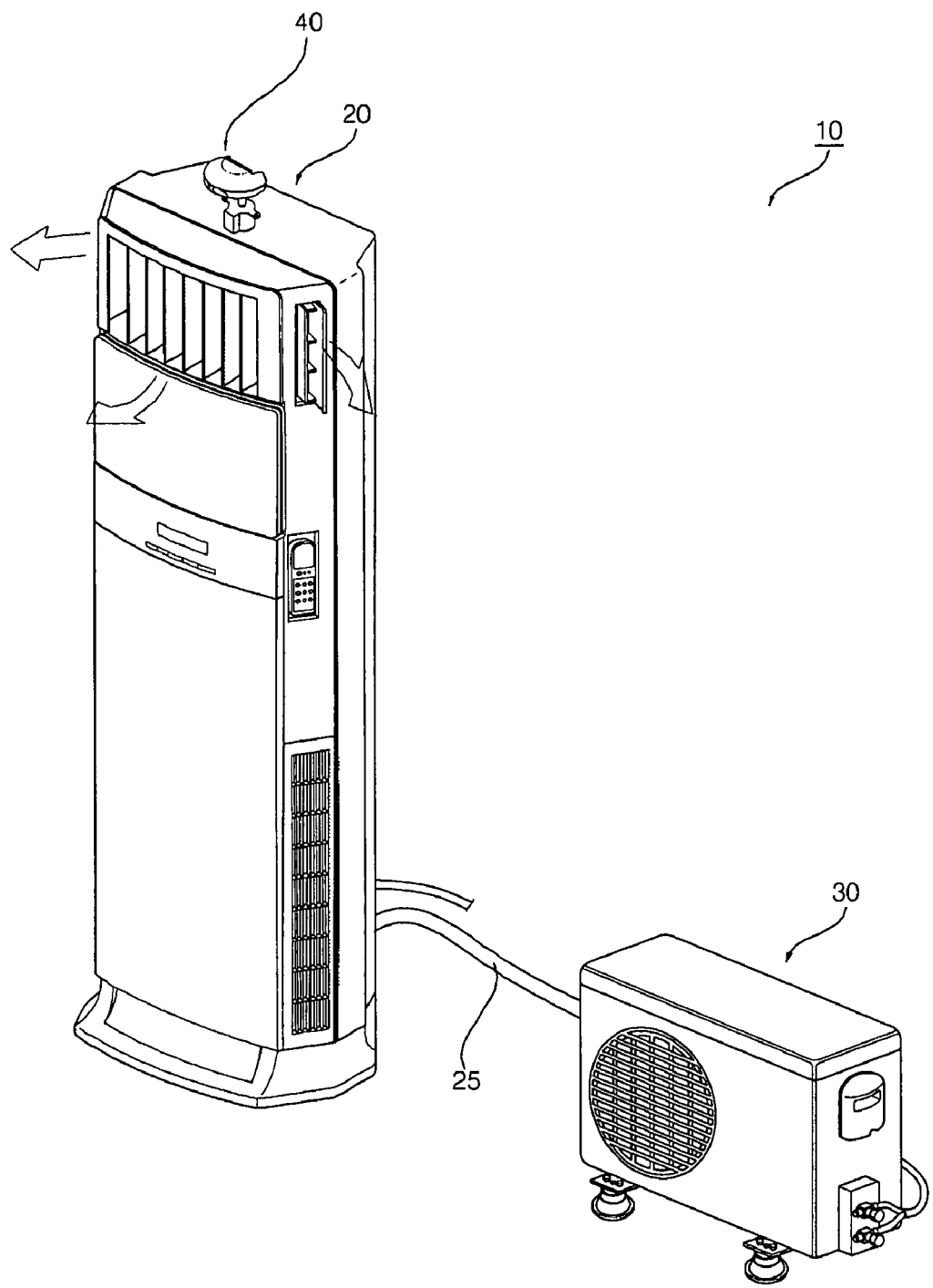
FIG. 1 is a perspective view showing an air conditioner according to an embodiment of the present invention.
Figure 2:
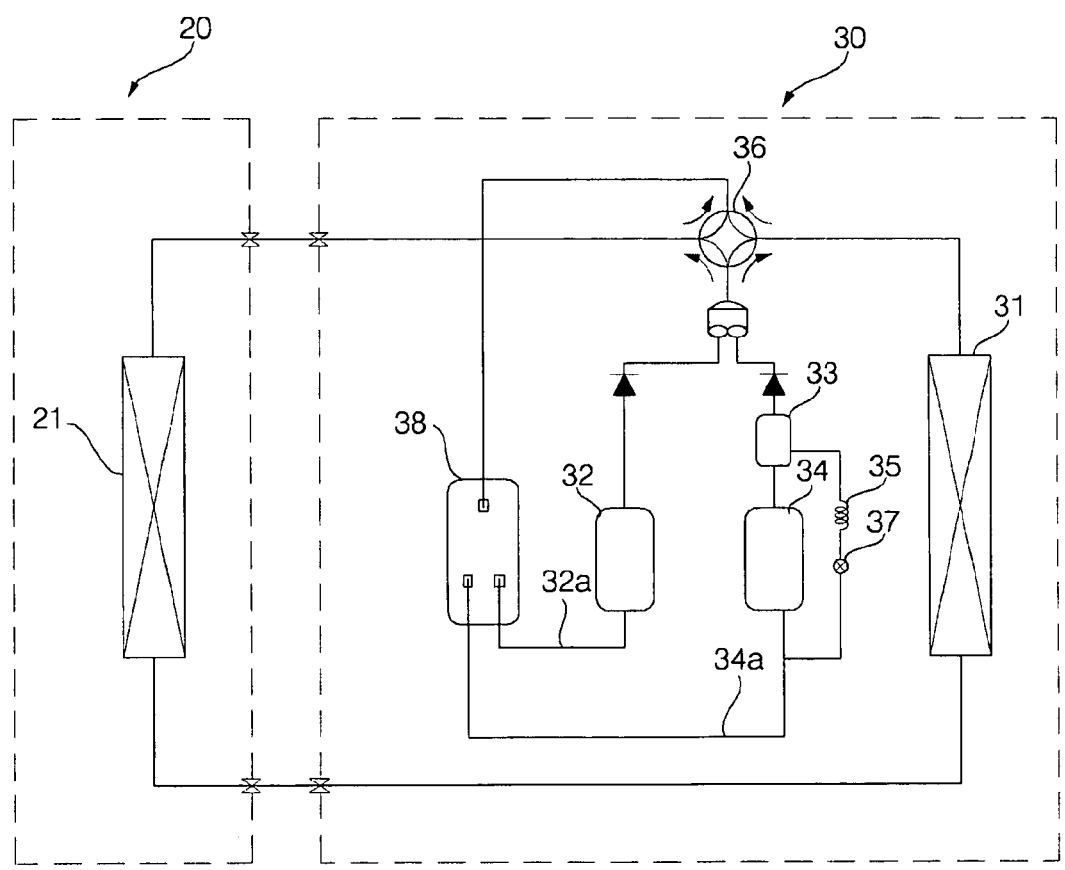
FIG. 2 is a simplified diagram showing the construction of the air conditioner shown in FIG. 1.

FIG. 1 is a perspective view showing an air conditioner according to an embodiment of the present invention, and FIG. 2 is a simplified diagram showing the construction of the air conditioner shown in FIG. 1.

The air conditioner according to the embodiment of the present invention may be applied to any air conditioners, such as a stand type air conditioner, a wall-mount air conditioner, and a ceiling type air conditioner. In the present invention, a stand type air conditioner is described as an example, for convenience of description.

Referring to FIGS. 1 and 2, the air conditioner 10 includes an indoor unit 20 and an outdoor unit 30. The indoor unit 20 and the outdoor unit 30 are coupled together by a refrigerant pipe 25.

Here, a sensor module 40 is mounted on the indoor unit 20 and is configured to detect radiation heats generated by heat sources and to output radiation signals of the heat source.

It is illustrated that the sensor module 40 is mounted on the outside top of the indoor unit 20, as shown in FIG. 1, but may be placed on the inside upper portion of the indoor unit 20.

The sensor module 40 includes at least one infrared sensor.

The indoor unit 20 includes an indoor heat exchanger 21 for performing heat exchange on an indoor air and refrigerants and an indoor ventilator (not shown) for improving the efficiency of the indoor heat exchanger 21 and at the same time circulating the indoor air.

The outdoor unit 30 includes an outdoor heat exchanger 31 configured to perform heat exchange on an outdoor air and refrigerants, a regulated compressor 32 and an inverter compressor 34 configured to compress the refrigerants, a 4-way valve 36 configured to connect the refrigerants, discharged from the regulated compressor 32 and the inverter compressor 34, to the outdoor heat exchanger 31 or the indoor heat exchanger 21, an accumulator 38 configured to supply the refrigerants of a gaseous state to the regulated compressor 32 and the inverter compressor 34, and an oil separation unit placed between the inverter compressor 34 and the 4-way valve 36 and configured to separate oil from flowing refrigerants.

In order to drive the air conditioner in an air-cooling cycle for an air cooling operation or a heating cycle for a heating operation, the 4-way valve 36 switches the flow of the refrigerants and supplies the refrigerants, discharged from the regulated compressor 32 and the inverter compressor 34, to the outdoor heat exchanger 31 or the indoor heat exchanger 21.

The accumulator 38 receives the refrigerants discharged from the 4-way valve 36 and supplies only the refrigerants of a gaseous state to the regulated compressor 32 and the inverter compressor 34.

The regulated compressor 32 is configured to compress a certain amount of the refrigerants and discharge the compressed refrigerants. The inverter compressor 34 can control the amount of compressed refrigerants in a certain range and discharge a controlled amount of refrigerants.

In particular, any one of or both the regulated compressor 32 and the inverter compressor 34 may be driven by a control unit (not shown) included in at least one of the indoor unit 20 and the outdoor unit 30. In this case, when one of the regulated compressor 32 and the inverter compressor 34 is driven, check valves (not shown) may be placed on respective discharge-side refrigerant pipes of the regulated compressor 32 and the inverter compressor 34 in order for the refrigerants to be introduced into the other compressor.

In the present embodiment, the air conditioner 10 is illustrated to include both the regulated compressor 32 and the inverter compressor 34, but may include only one of the regulated compressor 32 and the inverter compressor 34. Alternatively, the air conditioner 10 may include a plurality of the regulated compressors or a plurality of the inverter compressors.

The accumulator 38, the regulated compressor 32, and the inverter compressor 34 are connected to each other via connection pipes 32*a* and 34*a*.

The oil separation unit includes an oil separator 33 placed between a check valve and the inverter compressor 34, and a capillary tube 35 and a solenoid valve 37 placed between the oil separator 33 and the inverter compressor 34 and configured to bypass oil separated by the oil separator 33.

The capillary tube 35 is placed on the part of the oil separator 33, and the solenoid valve 37 is placed on the entry side of the inverter compressor 34.

The solenoid valve 37 is opened or shut at a predetermined cycle under the control of the controller of the air conditioner, so the oil separated by the oil separator 33 enters the entry side of the inverter compressor 34.

Further, the capacity of the regulated compressor 32 is greater than that of the inverter compressor 34. In the air cooling or heating operation, the inverter compressor 34 operates based on an indoor load capacity.

Figure 3:
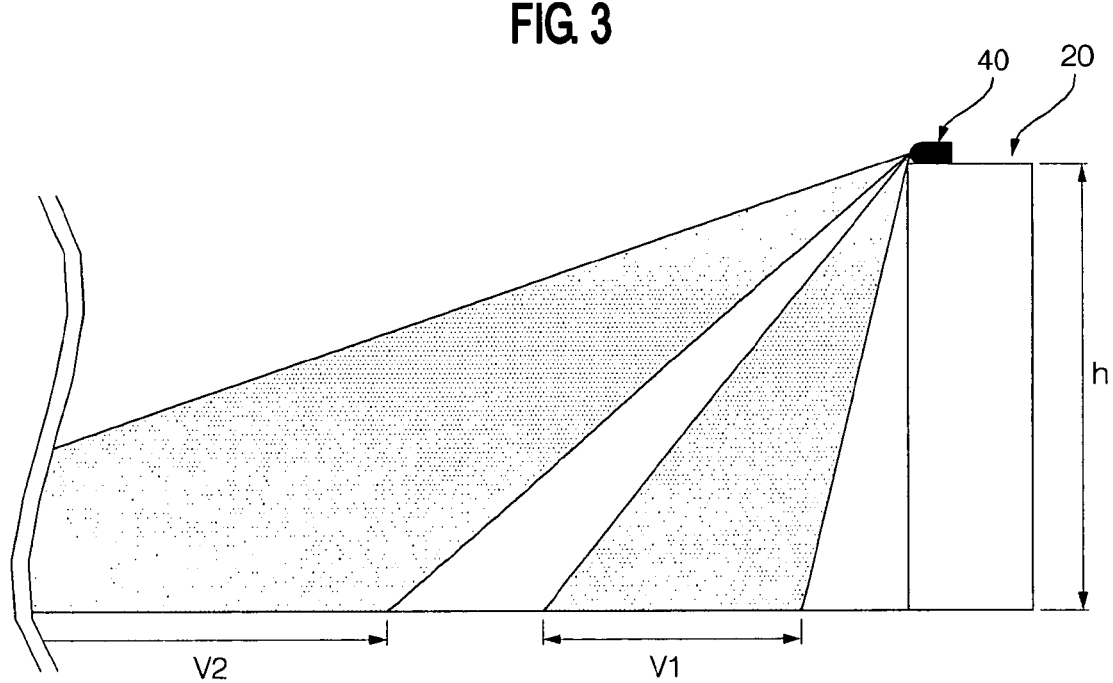
FIG. 3 is a lateral view showing the rotation recognition areas of a sensor module according to an embodiment of the present invention.

FIG. 3 is a lateral view showing the rotation recognition areas of the sensor module according to an embodiment of the present invention.

Referring to FIG. 3, the sensor module 40 is mounted on the outside top of the indoor unit 20 at a specific height 'h' from the bottom of the indoor unit 20. There are also shown rotation recognition areas V1 and V2 which are scanned by the sensor module 40 configured to rotate and detect the radiation heats of the heat sources within the respective rotation recognition areas.

The sensor module 40 includes at least one sensor (not shown) configured to rotate and scan each of the rotation recognition areas V1 and V2.

In the case where the at least one sensor rotates and scans the rotation recognition areas V1 and V2, when the sensor rotates in the clockwise direction, the sensor module 40 rotates at a first speed, scans the rotation recognition areas, and generates a first radiation signal. Further, when the sensor rotates in the counterclockwise direction, the sensor module 40 rotates at a second speed, scans the rotation recognition areas, and generates a second radiation signal.

The sensor module 40 transfers the first and second radiation signals to the indoor unit 20. The indoor unit 20 calculates detection information about the human body based on the first and second radiation signals and controls a discharge driving unit (not shown) so that the direction of the wind or the amount of the wind or both of an air-conditioned air is adjusted.

Figure 4:
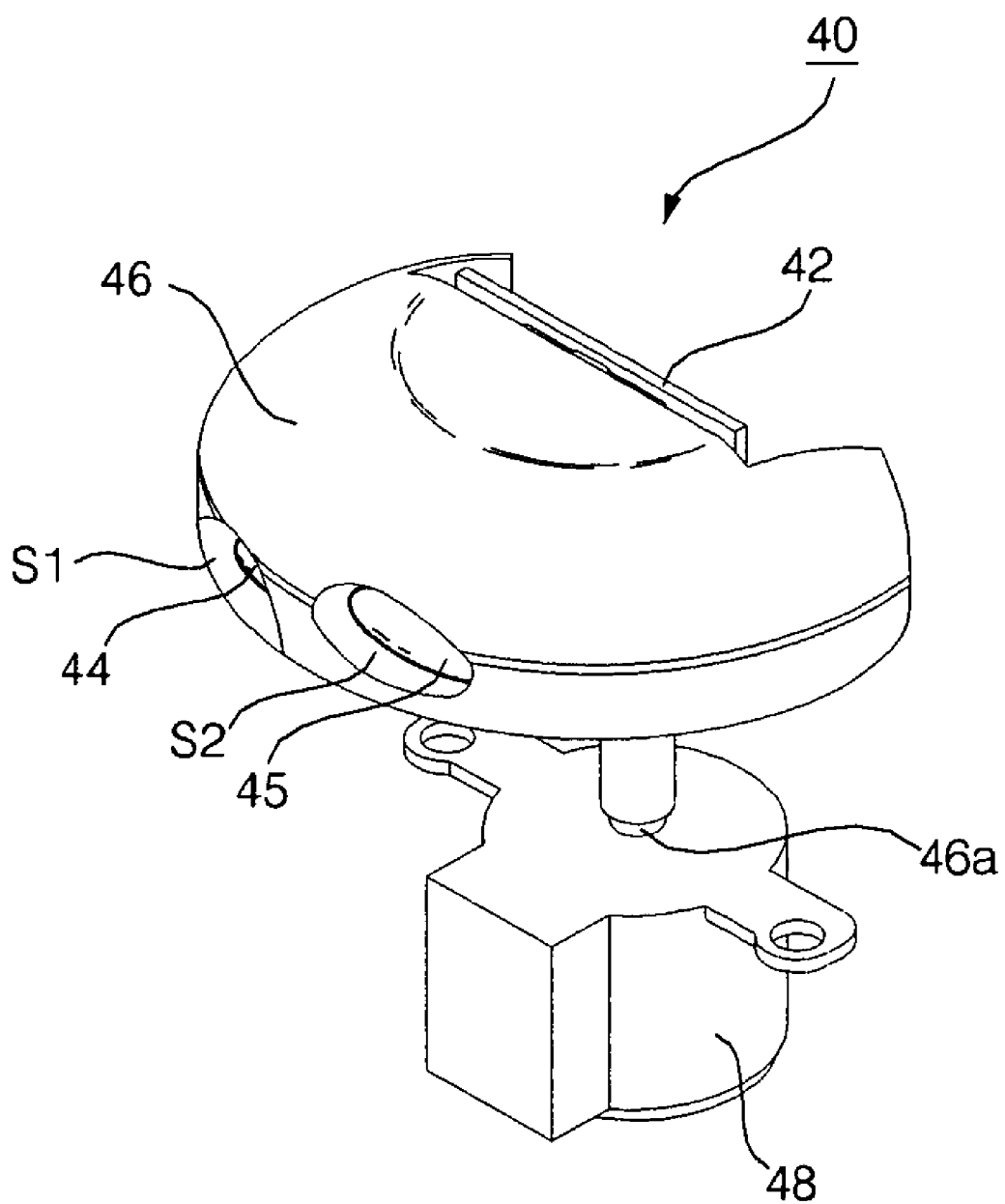
FIG. 4 is a perspective view of the sensor module shown in FIG. 3.
Figure 5:
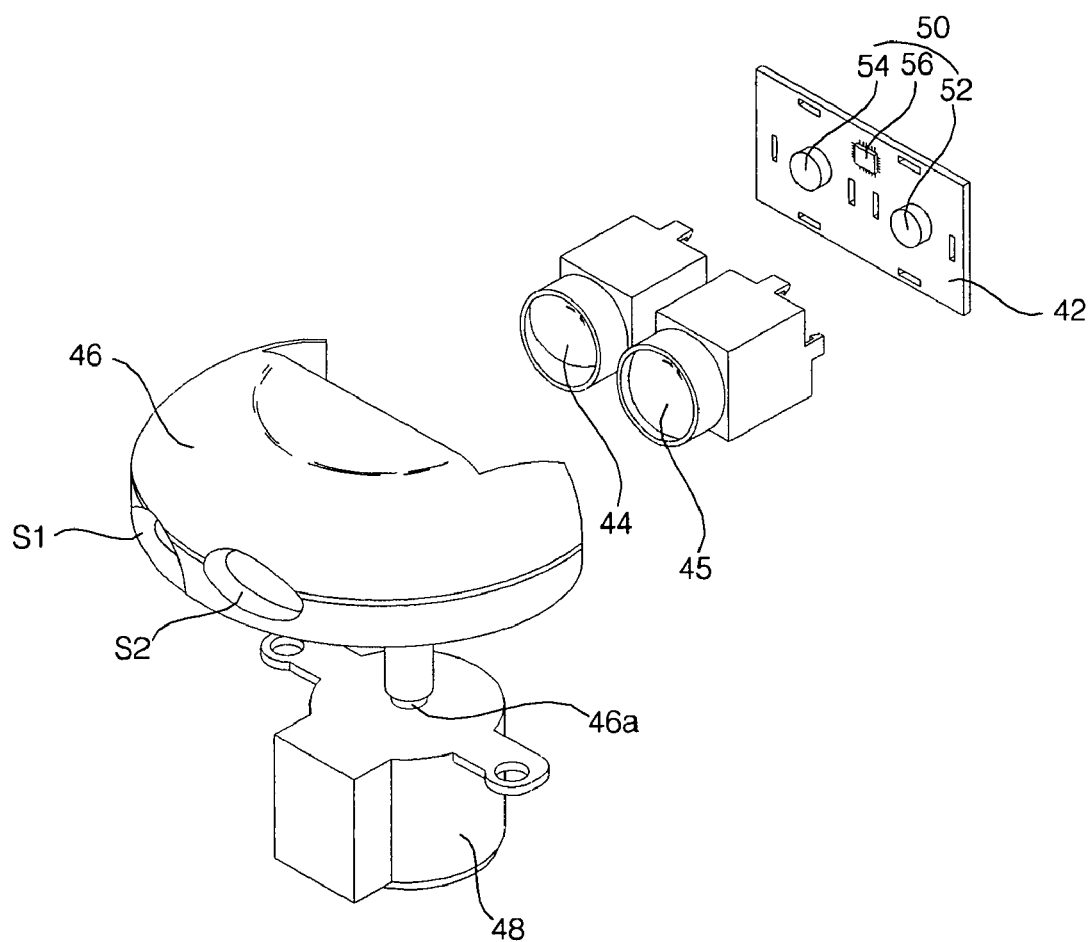
FIG. 5 is an exploded perspective view of the sensor module shown in FIG. 4.

FIG. 4 is a perspective view of the sensor module shown in FIG. 3, and FIG. 5 is an exploded perspective view of the sensor module shown in FIG. 4.

Referring to FIGS. 4 and 5, the sensor module 40 is mounted on the outside top of the indoor unit 20 and is configured to rotate and detect the radiation heats of heat sources by scanning the interior of a room.

In FIGS. 4 and 5, the sensor module 40 is illustrated to include two sensors, but is not limited thereto.

The sensor module 40 includes a board 42, lenses 44 and 45, a casing 46, and a step motor 48.

The board 42 may be a Printed Circuit Board (PCB) and is coupled to the rear side of the casing 46. A sensor unit 50, including first and second sensors 52 and 54, and a sensor control unit 56 are mounted on the board 42. The sensor control unit 56 transfers the first and second radiation signals for the respective radiation heats of the heat sources, detected by the first and second sensors 52 and 54, to the control unit (not shown) of the indoor unit 20 and controls the operation of the step motor 38.

The sensor control unit 56 may include a micro controller and transfers data for the first and second radiation signals to the control unit (not shown).

The first and second sensors 52 and 54 detect the radiation heats of the heat sources within the first and second rotation recognition areas V1 and V2, respectively, and output the first and second radiation signals through a change in the voltage having a specific amount. In other words, when infrared rays which have a wavelength longer than that of a visible ray and cannot be detected by the eyes are radiated from an object having absolute zero of −273° C. or more, the first and second sensors 52 and 54 detect the infrared rays and output the first and second radiation signals.

The first and second sensors 52 and 54 may be infrared sensors or pyroelectric elements, or may be elements having the pyroelectric properties and a pyroelectric effect (i.e., an effect in which electromotive force is maintained by electric charges generated from a device surface in proportion to temperature).

Each of the first and second sensors 52 and 54 includes a Cutrone filter which typically transmits the wavelength of an infrared area (7~14 μm) corresponding to an infrared wavelength band (6.5~15 μm) generated by the human body. The first and second sensors 52 and 54 further include respective electrodes for detecting electric charges, generated depending on a change in the temperature, in the form of voltage and for outputting the first and second radiation signals according to the detected electric charges.

The lenses 44 and 45 are optical structures for focusing infrared rays incident on the sensor unit 50 and protecting the front side of the sensor unit 50. The lenses 44 and 45 are spaced apart from the sensor unit 50.

The casing 46 protects the sensor unit 50 and integrates the board 42 and the sensor unit 50 into the lenses 44 and 45 (i.e., the optical structures).

The casing 46 includes a rotation shaft 46a to which the step motor 48 is coupled so that the sensor unit 50 can rotate.

First and second spaces S1 and S2 for determining the amounts of infrared rays, respectively, incident from the first and second rotation recognition areas V1 and V2 scanned by the respective first and second sensors 52 and 54, are formed in the casing 46.

The step motor 48 rotates the casing 46 so that the first and second sensors 52 and 54 rotate and detect infrared rays by scanning the first and second rotation recognition areas V1 and V2, respectively.

That is, the step motor 48 rotates at the first or second speed in the clockwise and counterclockwise directions.

It has been described that the sensor module 40 according to the present embodiment is mounted on the outside top of the indoor unit 20. However, the sensor module 40 may be placed within the indoor unit 20 from which an air-conditioned air is discharged, but not limited thereto.

Figure 6:
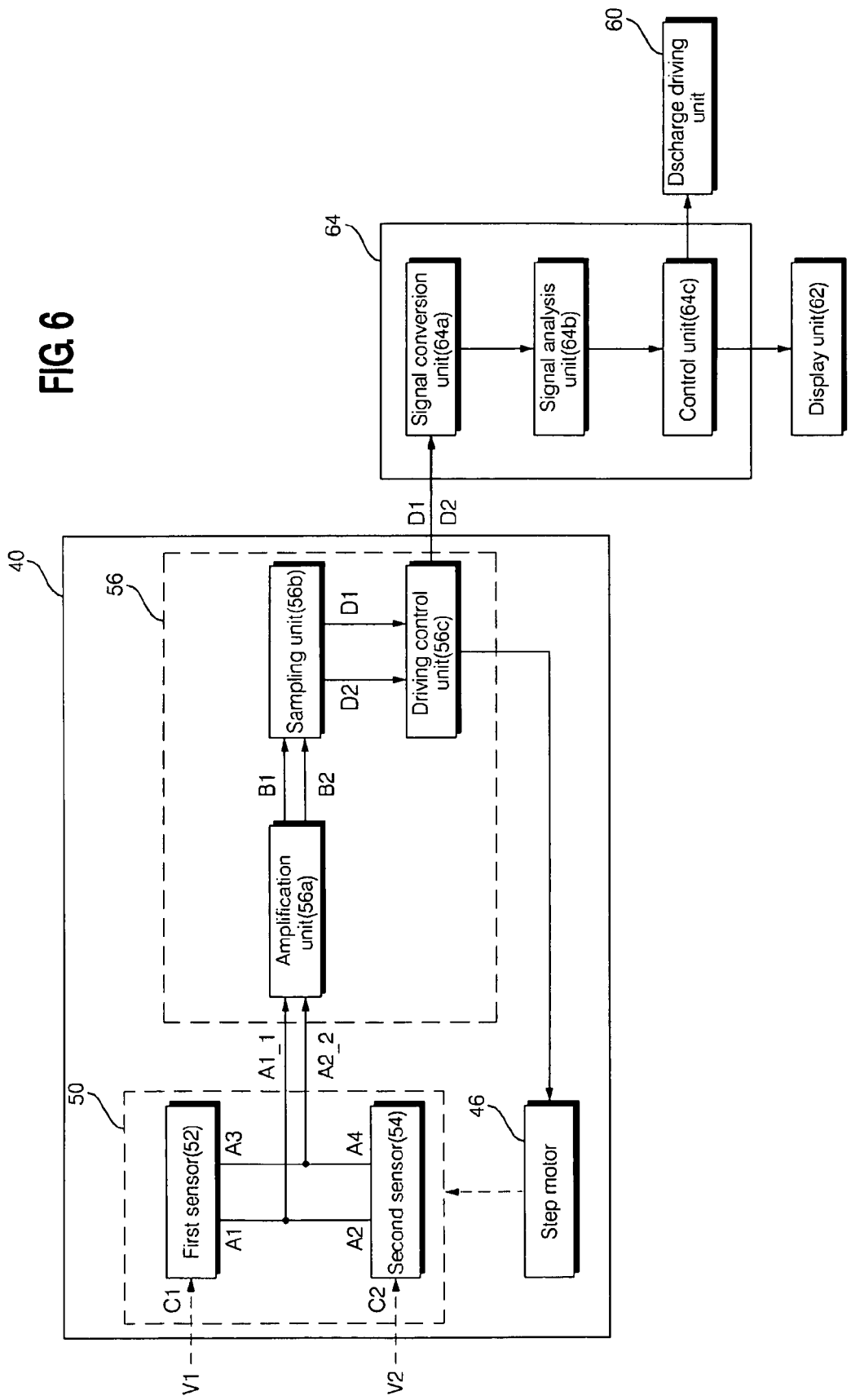
FIG. 6 is a functional block diagram of the air conditioner according to an embodiment of the present invention.

FIG. 6 is a functional block diagram of the air conditioner according to an embodiment of the present invention.

Referring to FIG. 6, the air conditioner 10 includes the sensor module 40 for calculating radiation signals for the respective radiation heats of the heat sources in the form of data and outputting the data, a discharge driving unit 60 for controlling the direction of the wind or the velocity of the wind or both of an air-conditioned air, a display unit 62 for displaying the direction of the wind or the velocity of the wind or both of the air-conditioned air and human body information, and a control unit 64 for calculating an observed change-amount signals based on the data and stored old data, acquiring human body information depending on energy levels based on the observed change-amount signals, and controlling the discharge driving unit.

The discharge driving unit 60 controls the direction of the wind of the air-conditioned air by adjusting the angle of at least one of upper and lower vanes and right and left vanes from which the air-conditioned air is discharged.

The discharge driving unit 60 also controls the amount of the wind or the velocity of the wind of the air-conditioned air by controlling the rotation speed of an indoor fan (not shown).

The display unit 62 displays the position of the human body and at least one of the direction of the wind and the velocity of the wind of the air-conditioned air depending on the human body information according to a control command from the control unit 64.

The sensor module 40 includes the sensor unit 50 for rotating in the clockwise and counterclockwise directions, scanning the rotation recognition areas, and outputting the first and second radiation signals A1_1 and A2_2 for the respective radiation heats C1 and C2 of the heat sources, the step motor 46 for rotating the sensor unit 50 in the clockwise and counterclockwise directions, and the sensor control unit 56 for calculating first and second data D1 and D2 based on the respective first and second radiation signals A1_1 and A2_2 and transferring the calculated data to the control unit 64.

The sensor unit 50 includes the first sensor 52 for detecting the first radiation heat C1 of the heat source within the first rotation recognition area V1 and the second sensor 54 for detecting the second radiation heat C2 of the heat source within the second rotation recognition area V2.

The first sensor 52 is inclined at a first predetermined angle and is configured to detect infrared rays (i.e., the first radiation heat C1 of the heat source) emitted from the first rotation recognition area V1.

Further, the second sensor 54 is inclined at a second predetermined angle and is configured to detect infrared rays (i.e., the second radiation heat C2 of the heat source) emitted from the second rotation recognition area V2.

The first radiation signal A1_1 includes first and second rotation radiation signals A1 and A2, which have been respectively detected within the first and second rotation recognition areas V1 and V2 by the first and second sensors 52 and 54, respectively, which rotate in the clockwise direction and scan the first and second rotation recognition areas V1 and V2. The second radiation signal A2_2 includes third and fourth rotation radiation signals A3 and A4, which have been respectively detected within the first and second rotation recognition areas V1 and V2 by the first and second sensors 52 and 54, respectively, which rotate in the counterclockwise direction and scan the first and second rotation recognition areas V1 and V2.

Here, an angle, formed by the first predetermined angle of the first sensor 52 with the ground, may be smaller than an angle, formed by the second predetermined angle of the second sensor 54 with the ground.

In other words, the first sensor 52 detects a close distance, and the second sensor 54 detects a long distance.

The step motor 46 is controlled by the control unit (not shown) included in the indoor unit 20 and is configured to rotate the first and second rotation directions E1 and E2 at the first and second speeds, respectively, according to first and second modes.

The step motor 46 may have a turning radius of 130 to 170°.

The sensor control unit 56 includes an amplification unit 56a, a sampling unit 56b, and a driving control unit 56c. The amplification unit 56a amplifies the first and second radiation signals A1_1 and A2_2 and outputs first and second amplification radiation signals B1 and B2. The sampling unit 56b samples each of the first and second amplification radiation signals B1 and B2 at a predetermined cycle and calculates first and second data D1 and D2. The driving control unit 56c transfers the first and second data D1 and D2 to the control unit 64 and controls the operation of the step motor 46.

The control unit 64 includes a signal conversion unit 64a, a signal analysis unit 64b, and a control unit 64c. The signal conversion unit 64a calculates smoothed observed change-amount signals M based on the first and second data D1 and D2, old first and second data D1_1 and D2_2, and a moving average of the sensor module 40. The signal analysis unit 64b acquires human body information by dividing the observed change-amount signals M depending on the energy levels. The control unit 64c transmits a control command to the discharge driving unit 60 based on the human body information and controls the direction of the wind or the velocity of the wind or both of the air-conditioned air.

$$\text{The amount of a change observed} = ]V(t)-V(t-1)]+]V(t)-V(\text{mean})] \qquad \text{[Equation]}$$

where V(t) denotes voltage (data) of a sensor detected at a point of time (t), V(t−1) denotes voltage (old data) of a sensor detected at a point of time (t−1), and V(mean) denotes an average output voltage being in an idle state.

The signal conversion unit 64a calculates the observed change-amount signals M by smoothing the amounts of changes observed, respectively, calculated using the above equation, based on the moving average of the sensor module 40.

That is, the observed change-amount signals M are calculated based on the moving averages of the sensor module 40 after the amounts of changes observed were respectively calculated based on the first and second data D1 and D2 for the first and second radiation signals A_1_1 and A2_2 and the old first and second data D1_1 and D2_2 using the above equation.

In this case, the moving average of the sensor module 40 may be converted from the time that the sensor unit 50 takes to rotate in the clockwise direction and scan the rotation recognition areas V1 and V2 and the time that the sensor unit 50 takes to rotate in the counterclockwise direction and scan the rotation recognition areas V1 and V2.

For example, a case where the signal conversion unit 64a calculates the observed change-amount signals M is described below.

The sensor control unit 56 amplifies the first and second radiation signals A1_1 and A2_2, output from the sensor unit 50 which rotates in the clockwise and counterclockwise directions once and scans the radius of 140°, into the first and second amplification radiation signals B1 and B2, respectively, calculates the first and second data D1 and D2 by sampling the amplified first and second amplification radiation signals B1 and B2, respectively, at a sampling cycle of 0.1757°, and transmits the calculated first and second data D1 and D2 to the signal conversion unit 64a.

Here, the sensor unit 50 rotates 4°/sec when rotating in the clockwise direction and rotates 22°/sec when rotating in the counterclockwise direction. That is, the step motor 46 operates at different speeds when being rotated by the sensor control unit 56 in the clockwise and counterclockwise directions.

In other words, the signal conversion unit 64a calculates the amounts of changes observed using the first and second data D1 and D2 and the old first and second data D1_1 and D2_2 according to Equation.

Further, the signal conversion unit 64a calculates the observed change-amount signals M which have been respectively smoothed from the amounts of changes observed using a specific number of the first and second data D1 and D2 and the old first and second data D1_1 and D2_2.

Each of the observed change-amount signals M includes a plurality of consecutive sine signals.

In the case where the signal conversion unit 64a calculates the observed change-amount signals M based on the first and second radiation signals A1_1 and A2_2 for the respective radiation heats of the heat sources, when a plurality of heat source radiation heats exists, a plurality of sine signals is included in each of the observed change-amount signals M.

The signal analysis unit 64b analyzes each of the observed change-amount signals M and outputs the human body information for each of the observed change-amount signals M.

Here, if one of first and second sine signals included in each of the observed change-amount signals M is placed between a first reference level and a second reference level of the energy levels, the signal analysis unit 64b determines the human body information as the human body and calculates position information of the human body.

Meanwhile, if one of the first and second sine signals is higher than the second reference level, the signal analysis unit 64b determines the human body information as a human body mistake factor. Next, the signal analysis unit 64b calculates a first starting point and a first end point for the first sine signal and a second starting point and a second end point for the second sine signal in a third energy level between the first and second energy levels, determines whether the human body is real based on an elapse time between the first end point and the second starting point, and calculates the number of human bodies.

Here, the signal analysis unit 64b may calculate the degree of concentration of the human bodies based on the time between the first starting point and the first end point and the time between the second starting point and the second end point.

The control unit 64c controls the operation of the discharge driving unit 60 by determining the direction of the wind or the velocity of the wind or both of the air-conditioned air, directed toward the human body, based on the human body information.

In other words, the control unit 64c determines the direction of the wind of the air-conditioned air as any one of swing, indirect wind, and direct wind based on the position information of the human body and controls the discharge driving unit 60 based on the determination.

FIGS. 7 and 8 are simplified views showing an operation of the sensor module shown in FIG. 6.

Referring to FIG. 7, when the sensor module 40 rotates in the clockwise direction E1, the first and second sensors 52 and 54 each detect human bodies U1 and U2 and a human body mistake factor X from heat sources U1, U2, and X by scanning the first and second rotation recognition areas V1 and V2, respectively, while rotating at a first speed. Then, the sensor module 40 outputs the first radiation signal A1_1 including the first and second rotation radiation signals A1 and A2.

Here, the first speed may be in the range of 2°/sec to 5°/sec. That is, in the rotation and scanning of the clockwise direction E1, the position of the human body mistake factor X is checked, separated, and removed in order to primarily separate and remove the human body mistake factor X from the heat sources U1, U2, and X.

Referring to FIG. 8, when the sensor module 40 rotates in the counterclockwise direction E2, the first and second sensors 52 and 54 each detect the human bodies U1 and U2 and the human body mistake factor X from the heat sources U1, U2, and X by scanning the first and second rotation recognition areas V1 and V2, respectively, while rotating at a second speed. Then, the sensor module 40 outputs the second radiation signal A2_2 including the third and fourth rotation radiation signals A3 and A4.

Here, the second speed may be in the range of 20°/sec to 24°/sec. That is, in the rotation and scanning of the counterclockwise direction E2, the human body mistake factor X which has not been primarily separated and removed from the heat sources U1, U2, and X is separated and removed.

A third rotation recognition area V3 shown in FIGS. 7 and 8 is used to determine the positions of the heat sources U1, U2, and X based on voltages of rotation radiation signals for the heat sources U1, U2, and X, which have been detected in each of the first and second rotation recognition areas V1 and V2 by each of the first and second sensors 52 and 54.

Figure 12:
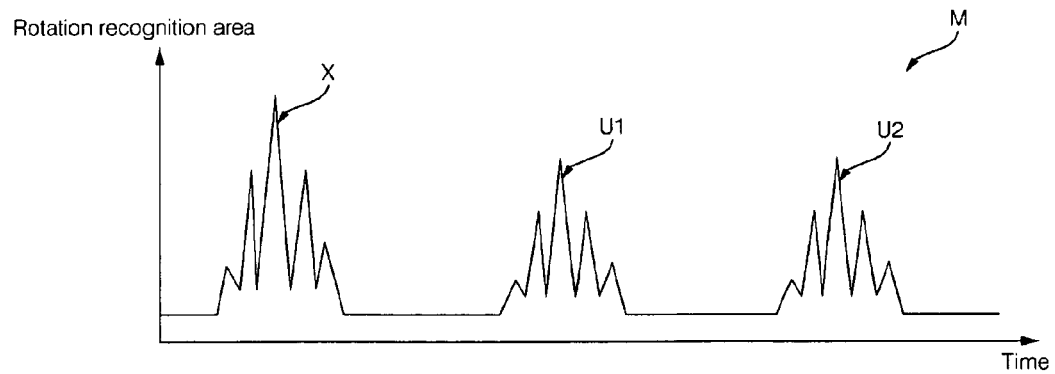
FIG. 12 is a waveform showing an observed change-amount signal obtained by smoothing each of the first and second data shown in FIG. 11.

FIG. 9 is a waveform showing a first radiation signal detected by the sensor module shown in FIG. 7, FIG. 10 is a waveform showing a second radiation signal detected by the sensor module shown in FIG. 8, FIG. 11 is a sampling diagram showing first and second data obtained by respectively sampling the first and second radiation signals shown in FIGS. 9 and 10, and FIG. 12 is a waveform showing observed change signals obtained by respectively smoothing the first and second data shown in FIG. 11.

FIG. 9(a) shows the first and second rotation radiation signals A1 and A2 detected from the radiation heats of the heat sources U1, U2, and X by the first and second sensors 52 and 54, respectively, when the sensor module 40 shown in FIG. 7 rotates in the clockwise direction E1 and scans the first and second rotation recognition areas V1 and V2. FIG. 9(b) shows that the first and second rotation radiation signals A1 and A2 shown in FIG. 9(a) are integrated into one.

FIG. 10(c) shows the third and fourth rotation radiation signals A3 and A4 detected from the radiation heats of the heat sources U1, U2, and X by the first and second sensors 52 and 54, respectively, when the sensor module 40 shown in FIG. 8 rotates in the counterclockwise direction E2 and scans the first and second rotation recognition areas V1 and V2. FIG. 9(d) shows that the third and fourth rotation radiation signals A3 and A4 shown in FIG. 10(a) are integrated into one.

FIG. 11(a) shows a waveform obtained by sampling the first radiation signal A1_1, shown in FIG. 9(b), at a predetermined cycle, and FIG. 11(b) shows a waveform obtained by sampling the second radiation signal A2_2, shown in FIG. 10(d), at a predetermined cycle.

The first and second data D1 and D2 obtained by sampling the first and second radiation signals A1_1 and A2_2, respectively, at a predetermined cycle are transferred to the signal analysis unit 64a.

FIG. 12 shows the observed change-amount signal M obtained by smoothing a moving average according to each of the amounts of changes observed which have been calculated using the first and second data D1 and D2 sampled in FIG. 11.

That is, the signal analysis unit 64a calculates the observed change-amount signals M having respective data values quantified by the first and second data D1 and D2 and the old first and second data D1_1 and D2_2.

FIG. 12 illustrates the heat sources U1, U2, and X so that they can be easily checked. However, the waveforms of the heat sources U1, U2, and X will be actually implemented so that they are much close to each other.

Figure 13:
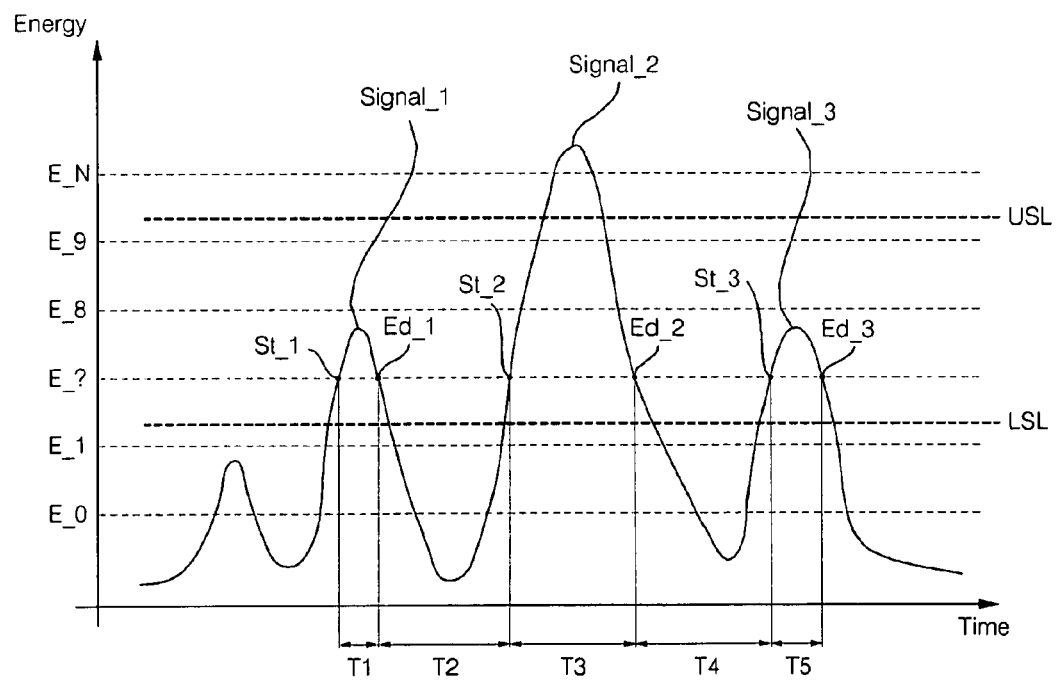
FIG. 13 is a waveform showing that the observed change-amount signal shown in FIG. 12 is divided into energy levels.

FIG. 13 is a waveform showing that the observed change signal shown in FIG. 12 is divided into energy levels.

FIG. 13 is described in connection with FIG. 6.

First, referring to FIG. 12, the observed change-amount signal M is formed to have a plurality of sine signals.

Here, the observed change-amount signal M appears differently because of parameters different from those of the observed change-amount signal M shown in FIG. 11.

That is, the observed change-amount signal M shown in FIG. 12 is used for a method of the signal analysis unit 64b of the control unit 60 outputting the human body information.

The signal analysis unit 64b recognizes the heat sources U1, X, and U2 as the first, second, and third sine signals Signal_1, Signal_2, and Signal_3, respectively.

As described above with reference to FIGS. 7 and 8, the heat source X is the human body mistake factor. A method of separating the human body mistake factor from the human body is described below in detail with reference to FIG. 12.

That is, the signal analysis unit 64b divides each of the first, second, and third sine signals Signal_1, Signal_2, and Signal_3 into energy levels E_0 to E_N.

Here, the signal analysis unit 64b includes a first reference level LSL and a second reference level USL. Each of the first and second reference levels LSL and USL may be formed in the same manner as the energy levels E_0 to E_N or may be formed differently from the energy levels E_0 to E_N. Each of the first and second reference levels LSL and USL may vary depending on the indoor temperature.

The signal analysis unit 64b sets a first starting point St_1 and a first end point Ed_1 which pass through the first energy level of the energy levels E_0 to E_N, placed between the first reference level LSL and the second reference level USL of the energy levels E_0 to E_N, for the first sine signal Signal_1 of the heat source U1, sets a second starting point St_2 and a second end point Ed_2 of the second sine signal Signal_2 of the heat source X, and a third starting point St_3 and a third end point Ed_3 of the third sine signal Signal_3 of the heat source U2.

Here, the signal analysis unit 64b calculates a first time T1 between the first starting point St_1 and the first end point Ed_1, a second time T2 between the first end point Ed_1 and the second starting point St_2, a third time T3 between the second starting point St_2 and the second end point Ed_2, a fourth time T4 between the second end point Ed_2 and the third starting point St_3, and a fifth time T5 between the third starting point St_3 and the third end point Ed_3.

In this case, the signal analysis unit 64b determines that the second sine signals signal_2 is the human body mistake factor because the heat source X is placed in the energy level E_N higher than the second reference level USL.

Further, the signal analysis unit 64b calculates the number of human bodies and the distribution of the human bodies depending on the first time T1 and the fifth time T5 and determines whether the acquired human body information is the human body based the second time T2 and the fourth time T4.

That is, the signal analysis unit 64b divides each of the observed change-amount signal M into the energy levels E_0 to E_N, separates the human body mistake factor from the human body, calculates human body information including at least one of the number of human bodies, the distribution of the human bodies, and whether the human body information is the human body, and transfers the calculated human body information to the control unit 64c.

Accordingly, the control unit 64c determines the direction of the wind and the velocity of the wind of the air-conditioned air, directed toward the human body, based on the human body information and controls the operation of the discharge driving unit 60 based on the determination.

That is, the control unit 64c may determine the direction of the wind of the air-conditioned air as one of swing, indirect wind, and direct wind based on the position information of the human body and may control the discharge driving unit 60.

As described above, the air conditioner of the present invention can precisely determine the human body and human body mistake factors. Accordingly, a comfortable indoor space can be maintained because an air-conditioned air can be discharged toward the human body placed within a room.

While the present invention has been shown and described in connection with the exemplary embodiments thereof, those skilled in the art will appreciate that the present invention may be changed and modified in various ways without departing from the spirit and scope of the present invention as defined in the following claims.

What is claimed is:

1. An air conditioner, comprising:
    a discharge driving unit for discharging an air-conditioned air;
    a sensor module for rotating and scanning predetermined areas and outputting data for radiation heats of heat sources; and
    a control unit for calculating observed change-amount signals based on the outputted data and stored old data, acquiring human body information by converting each of the observed change-amount signals into energy levels, and controlling the discharge driving unit,
    wherein the control unit comprises
    a signal conversion unit for calculating the observed change-amount signals by smoothing the data, the old data, and a moving average of the sensor module, and outputting the observed change-amount signals each including first and second sine signals;
    a signal analysis unit for acquiring the human body information by dividing each of the observed change-amount signals into the energy levels, determining that, if one of the first and second sine signals is placed between a first reference level and a second reference level of the energy levels, the acquired human body information is the human body, calculating the position information of the human body, and determining that the acquired human body information is a human body mistake factor when one of the first and second sine signals is higher than the second reference level; and wherein the control unit controls the discharge driving unit so that a direction of a wind and a velocity of the wind of the air-conditioned air are controlled according to the human body information, wherein the first and second reference levels vary depending on an indoor temperature.

2. The air conditioner as claimed in claim 1, further comprising a display unit for displaying the human body information and at least one of a direction of a wind and an amount of the wind of the air-conditioned air.

3. The air conditioner as claimed in claim 1, wherein the sensor module comprises:

a sensor for detecting the radiation heats of the heat sources and outputting radiation signals;

a step motor for rotating the sensor; and a sensor control unit for rotating the step motor, calculating the data based on the radiation signals, and transmitting the calculated data to the control unit.

4. The air conditioner as claimed in claim 3, wherein the sensor comprises at least one infrared sensor.

5. The air conditioner as claimed in claim 3, wherein the sensor control unit comprises:

an amplification unit for amplifying the radiation signals;

a sampling unit for sampling each of the amplified radiation signals at a predetermined cycle and outputting the data; and a driving control unit for transferring the data to the control unit and controlling the step motor.

6. The air conditioner as claimed in claim 1, wherein the human body information comprises at least one of whether a human body exists in the heat sources, the number of human bodies, and position information of a human body.

7. The air conditioner as claimed in claim 1, wherein the signal analysis unit calculates a first starting point and a first end point for the first sine signal and a second starting point and a second end point for the second sine signal in a third energy level between the first and second energy levels and calculates the number of human bodies by determining whether the acquired human body information is identical to the human body according to an elapse time between the first end point and the second starting point.

8. The air conditioner as claimed in claim 7, wherein the signal analysis unit calculates a degree of concentration of the human bodies according to a time between the first starting point and the first end point and a time between the second starting point and the second end point.

9. The air conditioner as claimed in claim 1, wherein the control unit controls an operation of the air discharge unit by determining the direction of the wind and the velocity of the wind of the air-conditioned air, directed toward the human body, based on the human body information.

10. The air conditioner as claimed in claim 9, wherein:

the human body information comprises at least one of whether a human body exists in the heat sources, the number of human bodies, and position information of a human body, and the control unit determines the direction of the wind of the air-conditioned air as any one of swing, indirect wind, and direct wind based on the position information of the human body.

* * * * *